Dec. 3, 1968  E. P. SUNDHOLM  3,414,170
LATCH ASSEMBLY FOR GREASE GUN PLUNGER RODS
Filed Oct. 19, 1967
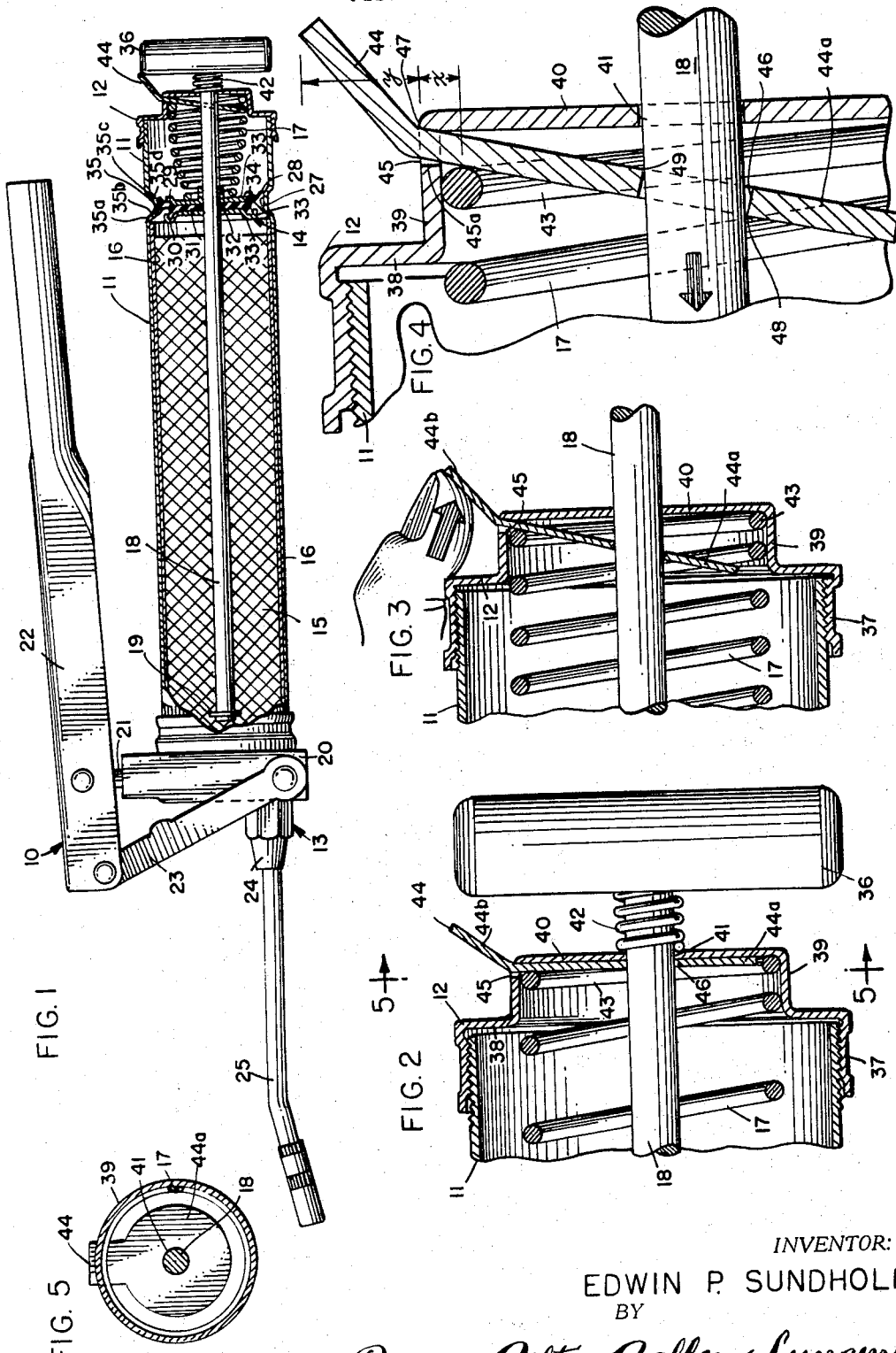
INVENTOR:
EDWIN P. SUNDHOLM
BY
Dawson, Tilton, Falloy & Lungmus
ATT'YS

United States Patent Office 3,414,170
Patented Dec. 3, 1968

3,414,170
LATCH ASSEMBLY FOR GREASE GUN PLUNGER RODS
Edwin P. Sundholm, Albert City, Iowa 50510
Filed Oct. 19, 1967, Ser. No. 676,432
3 Claims. (Cl. 222—340)

ABSTRACT OF THE DISCLOSURE

A latch assembly for restraining movement of a spring-biased plunger rod toward the dispensing head of a grease gun. The latch is provided with an opening through which the plunger rod passes and is disposed between the spring and the end closure cap of the grease gun, being normally maintained transversely to the plunger rod by the spring. An outer portion of the latch extends through opening in the end closure gap by which the operator may pivot the inner portion of the latch about the closure cap opening toward the grease dispensing end to engage the sides of the latch opening with the plunger rod.

Background of the invention

This invention relates to grease guns, and, more particularly, to grease guns adapted for use with cartridge-packaged greases.

The use of cartridge-packaged greases in connection with grease guns has increased rapidly in recent years. The loading of the grease guns with the cartridges is usually accomplished by drawing the plunger rod away from the dispensing head of the grease gun against the urging of the plunger spring. The plunger rod draws the plunger assembly along with it. The plunger assembly is drawn away from the dispensing head until it reaches an inwardly extending formed portion adjacent the rear end of the grease gun cylinder which compresses the resilient plunger. The plunger assembly must be maintained in this position against the urging of the compressed plunger spring until the cartridge is inserted within the grease gun cylinder and positioned against the formed portion. Thereafter, the tension on the plunger rod may be released and the resilient plunger will move forwardly from the formed portion to the interior of the cartridge.

Many locking devices have been provided for maintaining the plunger rod and plunger assembly in the withdrawn position until the grease cartridge can be properly positioned. However, these devices are generally relatively complicated, difficult to activate while the tension on the spring is maintained, and difficult to release after the cartridge has been inserted. It is also desirable to be able to lock the plunger in any intermediate position of withdrawal.

Summary of the invention

The latch is normally maintained in the unactivated position transversely of the plunger rod by the plunger spring, and the latch assembly can be easily activated by the operator even while using both hands to maintain the tension on the plunger spring. The latch assembly securely restrains the plunger rod and plunger assembly against forward movement, and the latch may be easily released simply by withdrawing the plunger rod slightly to allow the latch to be returned to the transverse position by the plunger spring.

Description of the drawing

FIG. 1 is a sectional side view of a grease gun equipped with the inventive latch assembly;

FIG. 2 is an enlarged fragmentary view of FIG. 1;

FIG. 3 is a view similar to FIG. 2 showing the plunger rod locked in the withdrawn position;

FIG. 4 is an enlarged fragmentary view of FIG. 3; and

FIG. 5 is a reduced sectional view taken along the line 5—5 of FIG. 2.

Description of the preferred embodiment

Referring to FIG. 1, the numeral 10 designates generally a grease gun which includes a grease cylinder 11, a closure cap 12 threadedly secured to the rear end of the grease cylinder 11, and a grease dispensing assembly 13 removably secured to the forward end of the grease cylinder. Plunger assembly 14 is slidably received by grease cylinder 11 and forces grease 15 contained within cylindrical grease cartridge 16 toward the dispensing assembly 13 under the urging of spirally wound plunger spring 17. Plunger rod 18 is slidably received by both the closure cap 12 and the plunger assembly 14 and is provided with a pin 19 for withdrawing the plunger assembly 14 away from the grease dispensing assembly against the urging of the plunger spring 17.

The construction and operation of grease dispensing assembly 13 is described more particularly in my earlier Patent No. 3,059,819, issued Oct. 23, 1962. For the purpose of this application it is believed sufficient to note that the grease dispensing assembly 13 includes a body 20 which slidably receives a piston 21 pivotally connected to an operating arm 22. The forward end of the operating arm is pivotally connected to a pair of links 23 which in turn are pivotally mounted on body 20, thereby permitting piston 21 to be reciprocated by the corresponding reciprocation of arm 22. Grease is pumped by piston 21 through grease discharge fitting 24 into grease applicator pipe 25.

The plunger assembly 14 includes a molded plunger 26, which should be formed of a resilient, flexible material that is resistant to deterioration on prolonged contact with grease. Certain synthetic rubbers have proved to be particularly advantageous. The plunger 26 provides a forward annular blade 27 and a rear annular blade 28 which are adapted to sealingly engage either the walls of the grease cylinder 11 or the walls of the cartridge 16. Blades 27 and 28 extend from a rear annular shoulder 29 of the plunger 26, and rear shoulder 29 and front annular shoulder 20 are joined by a transversely extending base portion 31 of the plunger. The plunger 26 may be advantageously formed integrally by a molding operation. The plunger 26 is interposed between a front disk 32 and a rear disk 33, both of which are slidably mounted on plunger rod 18. Front disk 32 is provided with a perimetrically extending flange 34 which receives the front shoulder 30 of the plunger, and rear disk 33 is provided with a perimetrically extending flange 33a which receives the rear shoulder 29 of the plunger. The front end of plunger spring 17 bears against rear disk 33 and is centered thereon by means of the flange 33a.

The plunger assembly is illustrated in FIG. 1 in the position subsequent to the loading of the grease gun with the grease cartridge 16. Grease cylinder 11 includes an inwardly extending perimetric formed portion 35 which is provided by a sloping forward wall 35a, generally transverse shoulder 35b, intermediate portion 35c, which is concentric with the remainder of the grease cylinder wall, and rear sloping wall 35d. The plunger assembly is pulled rearwardly toward the formed portion 35 by means of handle 36 attached to plunger rod 18. As the plunger rod 18 is withdrawn rearwardly from the grease cylinder, the plunger rod pin 19 engages the front disk 32 of the plunger assembly and pulls the plunger assembly rearwardly against the urging of plunger spring 17. As the plunger assembly passes into the formed portion 35, the blades 27 and 28 are compressed by the intermediate portion 35. The plunger assembly is then held in this position until the grease cartridge 16 is inserted in the forward end of the grease cylinder and the grease dispensing assembly 13 mounted thereon. The length of the grease cartridge 16 is such that the rear end thereof abuts the shoulder 35 of the formed portion. After the dispensing assembly is secured on the grease cylinder, the tension on plunger rod may be released, and the rod may be pushed forwardly to the position shown in FIG. 1. The plunger assembly is maintained in the loading position, however, by the grease contained within the grease cartridge. The grease is urged toward the grease dispensing assembly by the plunger assembly under the urging of plunger spring 17, and as the blades 27 and 28 proceed forwardly from the formed portion 35, they pass smoothly from shoulder 35 to the inner wall of the grease cartridge 16.

The latch assembly for maintaining the plunger assembly and plunger rod in the loading position while the cartridge is being inserted will now be described. Referring to FIG. 2, end enclosure cap 12 which is threadedly engaged with the rear end of grease cylinder 11 is seen to include a threaded portion 37, an inwardly extending shoulder portion 38, a rearwardly extending well portion 39 which is generally concentric with the threaded portion 37, and an end wall 40. The end wall 40 is provided with a circular opening 41 through which passes the plunger rod 18. The handle 36 of the plunger rod is spaced from the end wall 40 by spacer spring 42 so that it may be grasped by the operator.

Plunger spring 17 is received by the well portion 39 of the closure cap 12 and the bottom of the first turn 43 of the plunger spring abuts the end wall 40 of the closure cap. The diameter of the spring portion received by the well 39 is seen to be about the same as the inside diameter of the well. Interposed between the top of the first turn 43 and the end wall 40 is plunger rod latch 44. The latch 44 includes a generally circular inner portion 44a which is disposed within the well portion 39 of the closure cap (FIG. 5) and an outer portion 44b which extends outwardly from the closure cap through a slot 45 provided in the wall of the well portion 39. The inner portion 44a of the latch is provided with a generally circular opening 46 having a diameter slightly larger than the diameter of the plunger rod 18, and the latch is seen to be relatively flat with a thickness substantially less than the diameter of the opening 46.

The latch 44 is shown in its normal or unactivated position in FIG. 2 in which the inner portion 44a is maintained generally transversely of the plunger rod 18 by the plunger spring 17 which forces the latch against end wall 40. When the grease gun is to be loaded with a grease cartridge, the plunger assembly 14 is pulled rearwardly by grasping the grease cylinder 11 in one hand with the palm of that hand against the closure cap 12. The plunger rod handle 36 is then pulled outwardly from the grease cylinder until the plunger assembly is positioned within the formed portion of the grease cylinder. The operator then pushes the outer portion 44b of the latch rearwardly by the finger of the hand holding the grease cylinder so that the inner portion of the latch extends at an angle with respect to the plunger rod as shown in FIG. 3. The latch outer portion 44b preferably extends angularly with respect to the latch inner portion 44a to facilitate this step. As can be seen in FIG. 4 when the operator pushes the latch into the locking position, the latch pivots about the rear edge of slot 45 as at 47, and the outer latch portion 44b provides a lever arm indicated at y. In order for the latch to assume the angular locking position the latch inner portion must push the plunger spring 17 forwardly. Even though the compressed spring 17 may be exerting a substantial force against the latch, the spring is readily pushed forwardly to permit the latch to lock the plunger rod by virtue of the relatively short lever arm x which acts on the spring. The force exerted by the operator on the relatively long lever arm y provided by the latch outer portion results in a much greater force being exerted on the spring.

The latch is held in this position until the operator releases the outward pull on the plunger rod handle. The compressed plunger spring 17 urges the plunger assembly 14 and the plunger rod 18 forwardly toward the dispensing head into locking engagement with the latch 44, which is confined against forward movement by forward wall 45a of the slot 45. As can be best seen in FIG. 4, when the latch inner portion 44a is disposed at an acute angle with respect to the plunger rod axis, the outer corner portions of the wall of the latch opening 46 contact the outer surface of the plunger rod 18, as indicated at 48 and 49. The plunger rod 18 is being urged to the left in FIG. 4 by the plunger spring, and the greater the compression of the spring the more secure will be the contact between the latch and the plunger rod become. While the latching is assisted by the engagement at arcuate corner portions 48 and 49, the sharp angle of corner portion 49 provides the greater frictional engagement.

After the cartridge has been inserted and the grease dispensing assembly replaced on the forward end of the grease cylinder, the locking engagement between the latch and the plunger rod may be released by exerting a slight outward pull on the plunger rod. The outward pull of the plunger rod releases the contact between the rod and the latch at 48 and 49, and the first turn 43 of the compressed plunger spring then pushes the latch inner portion against the end wall 40 of the closure cap. The plunger rod may then be pushed inwardly into the grease cylinder 11, and the grease gun is ready for operation.

The plunger rod 18 may be locked in any position of withdrawal and need not be fully withdrawn to be locked. Even slight withdrawal of the plunger rod will compress the spring 17 so that if the latch is pivoted about its fulcrum point 47, the rod will be urged forwardly into locking engagement with the walls of the latch opening 46. A slight outward pull on the plunger rod will release the locking engagement, and the spring 17 will force the latch into its unactivated position transverse to the plunger rod. Thus, the same spring that urges the plunger rod forwardly and provides the force that locks the plunger rod against the latch also acts to return the latch to its original position.

While in the foregoing specification, a detailed description of an illustrative embodiment was set forth for the purpose of illustration, it is to be understood that many of the details herein given may be varied considerably by those skilled in the art without departing from the spirit and scope of the invention.

I claim:

1. In a grease gun, said grease gun including a grease cylinder, grease dispensing means on one end of said cylinder, and slidable plunger means within said cylinder, the combination of an end closure cap removably secured to the other cylinder end, said closure cap providing an outer portion having an opening therein, an elongated plunger rod slidably received by said closure cap and said plunger means, said plunger rod being generally circular in transverse cross section, coil spring means disposed about said plunger rod between said plunger assembly and said closure cap and biasing said plunger assembly and said plunger rod toward said dispensing means, said spring means having a rearward turn with a portion adjacent the inside of said cap opening, and a plunger rod latch between said spring means and the rearward portion of said closure cap, said latch including an inner portion provided with a generally circular opening having a diameter slightly larger than the diameter of said plunger rod for latching engagement with said rod and an outer portion extending outwardly from said grease gun through said cap opening provided in said closure cap for operating said latch, the said portion of said spring means adjacent said cap opening bearing against the forward side of said latch, and said latch immediately outward of said spring means portion pivoting a wall of said cap opening.

2. The combination of claim 1 in which said latch inner portion is normally retained against closure cap generally transversely to said plunger rod by said spring means to permit relative sliding movement between said plunger rod and said latch, said latch inner portion being pivotable about said closure cap opening away from said closure cap, whereby the sides of said latch opening engage said rod to restrain sliding movement of said plunger rod under the urging of said spring means and to permit sliding movement of said plunger rod against the urging of said spring means.

3. The combination of claim 2 in which said spring means comprises a spirally wound compression spring, the first turn of said spring urging said latch inner portion against said closure cap.

References Cited

UNITED STATES PATENTS 2,361,126    10/1944    Klein _____ 222—340
3,021,036    2/1962    Guedon _____ 222—256

FOREIGN PATENTS 1,270,689    7/1961    France.

ROBERT B. REEVES, *Primary Examiner.*

H. S. LANE, *Assistant Examiner.*